United States Patent Office  
3,150,184  
Patented Sept. 22, 1964

3,150,184  
17α-AMINO-D-HOMOANDROST-4-ENE-  
3,17-DIONE COMPOUNDS  
George W. Moersch and Duane F. Morrow, Ann Arbor, Mich., assignors to Parke, Davis & Company, Detroit, Mich., a corporation of Michigan  
No Drawing. Filed Nov. 23, 1962, Ser. No. 239,818  
4 Claims. (Cl. 260—563)

This invention relates to novel homoamino steroid compounds of the androstene series. More particularly, it relates to D-homoandrost-4-ene-3,17-dione compounds, which can be represented by the following formula

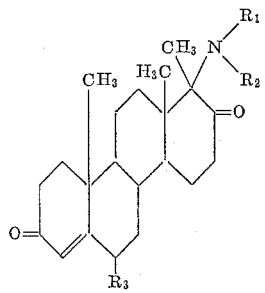

to acid-addition salts thereof, and to methods for their production. In the foregoing formula each of $R_1$, $R_2$, and $R_3$ represents hydrogen or methyl. When $R_3$ represents methyl in this formula, the methyl group is in the α-orientation.

In accordance with the invention, compounds of the foregoing formula are produced by the oxidation of D-homoandrost-5-ene-3β-ol-17-one compounds of the formula

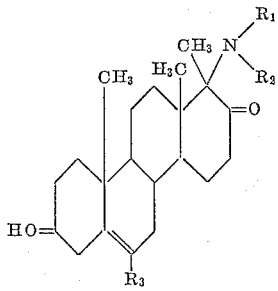

where $R_1$, $R_2$, and $R_3$ have the aforementioned significance. The oxidation is preferably carried out by reacting the D-homoandrost-5-ene-3β-ol-17-one compounds of the above formula with an aluminum alkoxide or phenoxide and a carbonyl compound, such as acetone or cyclohexanone, in an anhydrous inert aromatic solvent, such as benzene, toluene, or xylene, followed by hydrolyzing the reaction mixture with an aqueous medium. Preferred reagents for the first step of the process are aluminum isopropoxide and cyclohexanone, and the preferred solvent is toluene. The amounts of reagents may be varied, and preferably each is used in excess. For best results 1 to 3 moles of aluminum alkoxide and 10 to 50 moles of carbonyl compound per mole of steroid compound are employed. The time and temperature may be varied over a wide range, depending on the choice of solvent and carbonyl compound. In ordinary practice, the oxidation is carried out at the reflux temperature of the solvent for a period of ½ to 24 hours. At the completion of the first step, the reaction mixture is hydrolyzed with an aqueous medium such as water, dilute aqueous inorganic acids or bases and other media containing water, such as an aqueous solution of sodium potassium tartrate. The reaction product can be isolated from the hydrolyzed reaction mixture by methods well known in the art.

The D-homoandrost-5-ene-3β-ol-17-one compounds used as starting materials in the practice of the invention can be prepared in a number of ways. The 17a-dimethylamino compounds can be prepared by the alkylation with a suitable methylating agent of the 17a-amino and 17a-methylamino compounds. The 17a-amino and 17a-methylamino compounds can be prepared by heating pregn-5-ene-3β,17α-diol-20-one compounds of the formula

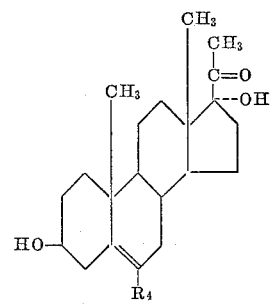

with liquid ammonia or methylamine under pressure. In the above formula $R_4$ represents hydrogen or methyl. Alternatively, some of the 17a-amino and 17a-methylamino compounds can be prepared by heating 17β-methyl-D-homoandrost-5-ene-3β,17α-diol-17a-one compounds of the formula

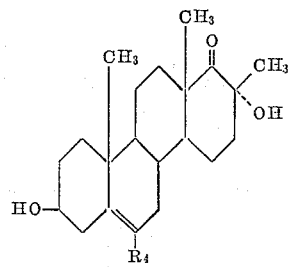

with liquid ammonia or methylamine under pressure. In this formula $R_4$ is as defined above.

Also in accordance with the invention, compounds of the formula

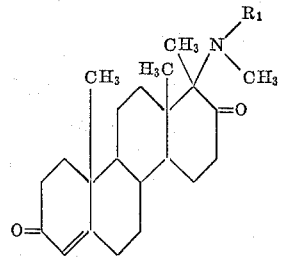

and acid-addition salts thereof, are produced by reacting a compound of the formula

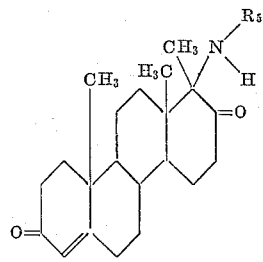

with a methylating agent in a neutral polar organic solvent in the presence of base. In the above formulas $R_1$ is as defined before and $R_5$ is hydrogen or methyl. A preferred methylating agent is methyl iodide although other methylating agents, such as methyl bromide, methyl chloride, methyl sulfate, methyl p-toluenesulfonate and the like may be used. The methylating agent is preferably employed in excess of the amount required to effect either mono- or di-methylation. Suitable solvents for the reaction are nitriles, such as acetonitrile; ethers, such as tetrahydrofuran and dioxane; and alcohols, such as ethanol and isopropyl alcohol. Other polar organic solvents may also be used. Inorganic bases, such as potassium carbonate, and organic bases, such as triethyl amine and pyridine can be employed. The temperature and time of reaction are not critical, and, in ordinary practice, the methylation is accomplished at the reflux temperature of the solvent for a period of 1 to 24 hours. The reaction product is normally isolated as the free base, but may be isolated as the acid-addition salt by acidification of the reaction mixture.

The free base compounds of the invention form acid-addition salts with a variety of inorganic and organic acids. Non-toxic salts are formed by the reaction of the free bases with such acids as hydrochloric, hydrobromic, hydriodic, sulfuric, acetic, benzoic, citric, succinic, tartaric, maleic, and related acids. The salt formation is suitably carried out by reacting the selected base with the selected acid in an unreactive solvent. The acid-addition salts can be converted to the free bases by reaction with a base such as potassium hydroxide or potassium carbonate. In the applications of this invention, the compounds are preferably employed in the form of acid-addition salts.

The compounds of the invention are useful pharmacological agents. They are capable of regulating the electrotype ablance of the body fluids, being adapted to block the effect of desoxycorticosterone acetate and aldosterone on urinary sodium and potassium levels. They are active upon parenteral administration.

The invention is illustrated by the following examples:

Example 1

A solution of 9.0 g. of 17a$\beta$-amino-17a$\alpha$-methyl-D-homoandrost-5-ene-3$\beta$-ol-17-one in 500 ml. of toluene is treated with 12.4 g. of aluminum isopropoxide and 90 ml. of cyclohexanone, and the mixture is stirred and heated under reflux for 45 minutes. The mixture is allowed to cool, is washed well with a saturated aqueous solution of sodium potassium tartrate and with water, and the isolated organic solution is dried over anhydrous magnesium sulfate. The dried solution is concentrated to dryness under reduced pressure to give 17a$\beta$-amino-17a$\alpha$-methyl-D-homoandrost-4-ene-3,17-dione, isolated as an oil. The oil is converted to the hydrochloride salt by dissolving it in ether and treating the resulting solution with dry hydrogen chloride. The solid obtained can be recrystallized from a methanol-ethyl acetate solvent mixture to give 17a$\beta$-amino-17a$\alpha$ - methyl - D - homoandrost-4-ene-3,17-dione hydrochloride (containing one mole of methanol of crystallization); M.P. 217–220° C.; $[\alpha]_D^{23}$ +9.5° (1% in methanol).

The 17a$\beta$ - amino-17a$\alpha$-methyl-D-homoandrost-5-ene-3$\beta$-ol-17-one used as starting material is prepared as follows:

A mixture containing 40.0 g. of pregn-5-ene-3$\beta$,17$\alpha$-diol-20-one and 600 ml. of liquid ammonia is heated under pressure in a pressure vessel at 190–200° C. for ten hours. The reaction mixture is allowed to cool, the excess ammonia is vented, and the residue is dissolved in methanol. The methanolic solution is filtered and the filtrate is concentrated to dryness under reduced pressure. The residue is dissolved in 400 ml. of isopropyl alcohol, 40 ml. of 12 N hydrochloric acid is added, and the mixture is heated on the steam bath for one hour. Upon filtration of the cooled mixture, there is obtained a mixture of the hydrochloride salts of 17a$\beta$-amino-17a$\alpha$-methyl-D-homoandrost-5-ene-3$\beta$-ol-17-one and 17a$\alpha$-amino-17a$\beta$-methyl-D-homoandrost-5-ene-3$\beta$-ol-17-one. The mixture of hydrochloride salts is treated with a slight excess of potassium carbonate in aqueous solution, and the desired free base, 17a$\beta$-amino - 17a$\alpha$-methyl-D-homoandrost-5-ene-3$\beta$-ol-17-one, is obtained by fractional crystallization from ethanol; M.P. 199–200° C.; $[\alpha]_D^{24}$ −111° (1% in methanol).

The pure hydrochloride salt is prepared by dissolving the free base in dry ether and treating the resulting solution with a slight excess of dry hydrogen chloride. The solid obtained is isolated by filtration, dried, and recrystallized from isopropyl alcohol; M.P. 295° C.

Example 2

A solution of 1.0 g. of 17a$\alpha$-amino-6,17a$\beta$-dimethyl-D-homoandrost-5-ene-3$\beta$-ol-17-one in 125 ml. of toluene is treated with 10 ml. of cyclohexanone and 1.0 g. of aluminum isopropoxide, and the mixture is stirred and heated under reflux for 40 minutes. The mixture is cooled in ice, diluted with an equal volume of ether, washed well with a cold, saturated aqueous solution of sodium potassium tartrate and with water, and the phases are separated. The aqeuous phase is extracted with ether, the extracts are combined with the organic phase, and the organic solution is dried over anhydrous magnesium sulfate. The dried solution is concentrated to dryness under reduced pressure to give 17a$\alpha$-amino-6$\alpha$,17a$\beta$-dimethyl-D-homoandrost-4-ene-3,17-dione, isolated as an oil. The oil is converted to the hydrochloride salt by dissolving it in ether and treating the resulting solution with dry hydrogen chloride. The solid obtained can be recrystallized from isopropyl alcohol; M.P. 230–232° C.

The free base is obtained by dissolving the hydrochloride salt in water, washing the aqueous solution with ether, adding a slight excess of potassium carbonate to render the aqueous solution alkaline, and isolating the solid obtained by filtration. The free base can be recrystallized from ethanol.

The citrate salt is prepared by adding a solution of the free base in methanol to a solution of citric acid in methanol. The resulting mixture is concentrated, and the solid product is isolated by filtration and dried in vacuo.

The starting material, 17a$\alpha$-amino-6,17a$\beta$-dimethyl-D-homoandrost-5-ene-3$\beta$-ol-17-one, is prepared by heating a mixture of 6-methyl-pregn-5-ene-3$\beta$,17$\alpha$-diol-20-one, 1,2-dimethoxyethane and liquid ammonia under pressure at 190–200° C. for ten hours. After cooling and venting excess ammonia the residue is diluted with methanol, the resulting mixture is filtered and the filtrate is evaporated to dryness. The residue is dissolved in isopropyl alcohol, an excess of 12 N hydrochloric acid is added, and the mixture is heated on the steam bath for two hours. The solution is again concentrated to dryness under reduced pressure, and the crude salt obtained is dissolved in water. The aqeous solution is washed well with ether, and treated with solid potassium carbonate. The precipitate is isolated, washed with water, and dried to give 17a$\alpha$-amino-6,17a$\beta$ - dimethyl - D - homoandrost-5-ene-3$\beta$-ol-17-one, which is recrystallized from an ethanol-water solvent mixture; M.P. 234–235° C.

The starting material used in this example can also be prepared by heating 6,17$\beta$-dimethyl-D-homoandrost-5-ene-3$\beta$,17$\alpha$-diol-17a-one with ammonia according to a procedure analogous to that described above.

Example 3

A solution of 6.6 g. of 17a$\alpha$-dimethylamino-17a$\beta$-methyl-D-homoandrost 5-ene-3$\beta$-ol-17-one in 20° ml. of toluene is treated with 10 g. of aluminum isopropoxide and 80 ml. of cyclohexanone, and the mixture is stirred and heated under reflux for 40 minutes. The mixture is cooled, washed well with a saturated aqueous solution of sodium potassium tartrate and with water, and dried over anhydrous magnesium sulfate. The dried solution is evaporated to dryness under reduced pressure to give 17a$\alpha$ - dimethylamino-17a$\beta$-methyl-D-homoandrost-4-ene-3,17-dione, isolated as an oil. The oil is dissolved in dry ether and the ether solution is treated with dry hydrogen chloride. The precipitated hydrochloride salt is isolated and recrystallized from isopropyl alcohol; M.P. 204–207° C.; $[\alpha]_D^{24}$ −37° (1% in methanol).

The free base, 17aα-dimethylamino-17aβ-methyl-D-homoandrost-4-ene-3,17-dione, is obtained from the hydrochloride salt by treating the salt with a slight excess of potassium carbonate in aqueous solution, isolating the precipitate and recrystallizing from a mixture of ethyl acetate and heptane; M.P. 189–191° C.; $[\alpha]_D^{23}$ +18°.

The hydrobromide salt can be prepared by dissolving the free base in dry ether and treating the resulting solution with dry hydrogen bromide. The solid obtained is isolated by filtration, dried, and recrystallized from a mixture of methanol and ethyl acetate.

The succinate is prepared by adding a solution of the free base in methanol to a solution of succinic acid in methanol. The resulting mixture is concentrated and the solid product is isolated by filtration and dried in vacuo.

The starting material, 17aα-dimethylamino-17aβ-methyl-D-homoandrost-5-ene-3β-ol-17-one, is prepared by treating a solution of 17aα-methylamino-17aβ-methyl-D-homoandrost-5-ene-3β-ol-17-one (or, alternatively, 17aα-amino-17aβ-methyl-D-homoandrost-5-ene-3β-ol-17-one) in dry acetonitrile with potassium carbonate and an excess of methyl iodide, and stirring and heating the resulting mixture under reflux for 24 hours. After cooling and evaporation to dryness under reduced pressure, the residue is extracted with ether and the ether solution is treated with dry hydrogen chloride. The precipitated hydrochloride salt is isolated and recrystallized from isopropyl alcohol; M.P. 222–222.5° C. This compound has useful pharmacological properties. It is capable of regulating the electrolyte balance of the body fluids and can be used to block the effect of desoxycorticosterone acetate and aldosterone on urinary sodium and potassium. It is active upon parenteral administration. The free base, 17aα-dimethylamino-17aβ-methyl-D-homoandrost-5-ene-3β-ol-17-one, is obtained by treating the hydrochloride salt with a slight excess of potassium carbonate in aqueous solution and recrystallizing the solid obtained from a mixture of diethyl ether and petroleum ether; M.P. 107–109° C. and 163–165° C.

The compounds used in the methylation procedure above, namely, 17aα-methylamino-17aβ-methyl-D-homoandrost-5-ene-3β-ol-17-one, and 17aα-amino-17aβ-methyl-D-homoandrost-5-ene-3β-ol-17-one, are prepared by heating pregn-5-ene-3β,17α-diol-20-one or 17β-methyl-D-homoandrost-5-ene-3β,17α-diol-17a-one with methylamine or ammonia under pressure and isolating the resulting products as described in the previous examples.

*Example 4*

A mixture containing 3.3 g. of 17aα-amino-17aβ-methyl-D-homoandrost-4-ene-3,17-dione, 3.5 g. of potassium carbonate, and 9 ml. of methyl iodide in 250 ml. of dry acetonitrile is stirred and heated under reflux for 24 hours. After cooling, the mixture is evaporated to dryness under reduced pressure. The residue is extracted with ether, and the ether solution is washed with water and dried over anhydrous magnesium sulfate. Anhydrous hydrogen chloride is added to the dried ether solution and the precipitated hydrochloride salt of 17aα-dimethylamino-17aβ-methyl-D-homoandrost-4-ene-3,17-dione is isolated and recrystallized from isopropyl alcohol; M.P. 204–207° C.; $[\alpha]_D^{24}$ −37° (1% in methanol).

The corresponding free base is obtained by treating the salt with a slight excess of potassium carbonate in aqueous solution, isolating the precipitate and recrystallizing from a mixture of ethyl acetate and heptane; M.P. 189–191° C.; $[\alpha]_D^{23}$ +18° (1% in methanol).

We claim:
1. A member of the class consisting of D-homoandrost-4-ene-3,17-dione compounds, having the formula

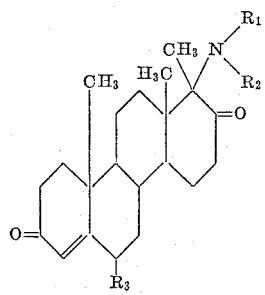

and acid-addition salts thereof, where $R_1$, $R_2$, and $R_3$ are chosen from the class consisting of hydrogen and methyl.

2. 17aβ-amino-17aα-methyl-D-homoandrost-4-ene-3,17-dione hydrochloride.

3. 17aα-amino-6α,17aβ-dimethyl-D-homoandrost-4-ene-3,17-dione hydrochloride.

4. 17aα-dimethylamino-17aβ-methyl-D-homoandrost-4-ene-3,17-dione hydrochloride.

References Cited in the file of this patent

UNITED STATES PATENTS

| | | |
|---|---|---|
| 2,212,149 | Brubaker et al. | Aug. 20, 1940 |
| 2,582,258 | Julian et al. | June 15, 1952 |
| 2,795,612 | Luduena | June 11, 1957 |

OTHER REFERENCES

Adams et al.: "Organic Reactions," vol. VI, pp. 207–238 (1951) QD 25107.

Joska et al.: Collection Czeck, Chem. Communs., vol. 21, pp. 754–760 (1956) QDIC 69.

Kasal et al.: Collection Czech. Chem. Communs., vol. 25, pp. 927–933 (1960) QDIC69.